United States Patent [19]
Everhart

[11] Patent Number: 5,467,696
[45] Date of Patent: Nov. 21, 1995

[54] GREASE FREE SKILLET

[76] Inventor: Rick J. Everhart, 9913 Belmont, Kansas City, Mo. 64134

[21] Appl. No.: 374,042

[22] Filed: Jan. 18, 1995

[51] Int. Cl.⁶ .............................. A47J 37/06; A47J 37/10
[52] U.S. Cl. ................... 99/425; 99/375; 99/446
[58] Field of Search ................ 99/375, 400, 422, 99/425, 426, 446, 444, 445; 126/390; 219/524, 525, 462–464

[56] References Cited

U.S. PATENT DOCUMENTS

| | | |
|---|---|---|
| 2,980,101 | 4/1961 | Anetsberger et al. . |
| 3,106,887 | 10/1963 | Bryl . |
| 3,245,337 | 4/1966 | White et al. .................. 99/375 |
| 3,664,256 | 5/1972 | Peirce ........................ 99/425 |
| 3,738,256 | 6/1973 | Joeckel . |
| 3,805,688 | 4/1974 | Gvozdjak . |
| 3,811,375 | 5/1974 | Fritzsche . |
| 3,938,431 | 2/1976 | Potvin . |
| 4,011,431 | 3/1977 | Levin ........................ 99/375 |
| 4,173,179 | 11/1979 | Arthur ....................... 219/524 |
| 4,270,067 | 5/1981 | Thomas et al. ............... 219/463 |
| 4,352,324 | 10/1982 | Noh . |
| 5,160,829 | 11/1992 | Chang . |
| 5,365,038 | 11/1994 | Mitsugu ...................... 99/425 |

*Primary Examiner*—Timothy F. Simone
*Attorney, Agent, or Firm*—Chase & Yakimo

[57] ABSTRACT

A skillet having a grease tray slidably mounted within a track system, the latter comprising a pair of rails mounted to the underside of the cooking surface. A plurality of apertures in the center of an inclined cooking surface directs grease formed on the cooking surface to the tray thereinbelow. A lid on the underside of the surface is variously adjustable by the user so as to regulate the amount of grease being drained from the cooking surface. The tray has a spout or funnel at the front end thereof to enhance drainage of the grease therefrom. Flanges at the corners of the tray preclude spillage at the corners during pouring.

16 Claims, 2 Drawing Sheets

GREASE FREE SKILLET

BACKGROUND OF THE INVENTION

This invention relates to a cooking device and, more particularly, to an electric skillet adapted for regulating the removal of grease from the cooking surface for deposit into a removable grease catcher.

During cooking it is desirable to remove grease from the cooking surface so that the grease will not intermingle with the cooked food. Once removed from the cooking surface it is further desirable to have means to easily deposit the grease into a separate storage area. It is further advantageous to have the ability to regulate the amount of grease drained from the cooking surface of the skillet.

Heretofore, to drain a skillet one had to lift the skillet and direct the grease out of one corner. This exercise could result in the food being deposited along with the grease or the grease itself being spilled on the user and/or counter top. Such adverse results are not unusual as the skillets are usually relatively heavy and cumbersome to handle. Although previous devices have attempted to address the drainage of grease from the cooking surface they have not solved the problem of draining the grease into a handy transportable container along with the ability to selectably regulate the amount of grease drained from the cooking surface.

In response thereto I have invented an improved skillet comprising a series of drain apertures on a preferably tapered cooking surface, the opening and closing of the apertures being regulated by a user-operated cover. Upon drainage of the grease through the apertures, the grease is deposited into an underlying tray slidably removable from a track system underneath the skillet. Deposit of the collected grease is enhanced by a grease tray design which efficiently allows the user to deposit the grease in a waste container while preventing grease spillage. The cooperation of the apertures, cover and underlying tray allows various users to regulate the accumulation of grease on the cooking surface according to individual cooking tastes.

It is therefor a general object of this invention to provide a skillet, electric or otherwise, which allows for a regulated drainage of grease from the cooking surface.

Another object of this invention is to provide a skillet, as aforesaid, which has a series of apertures in the cooking surface for drainage of grease therethrough.

A further object of this invention is to provide a skillet, as aforesaid, which has an inclined cooking surface for directing the grease to the apertures.

Another object of this invention is to provide a skillet, as aforesaid, which presents a user-controlled lid for opening and closing a selected number of skillet apertures.

A further object of this invention is to provide a skillet with lid, as aforesaid, the lid being slidable within and without a guide housing.

Another particular object of this invention is to provide a skillet, as aforesaid, having a track system on the underside of the skillet for slidably receiving the grease tray therein.

Still another further object of this invention is to provide a skillet, as aforesaid, having a grease tray configured for efficient deposit of the grease into a waste container.

A further object of this invention is to provide a skillet, as aforesaid, having an easily transportable grease container.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
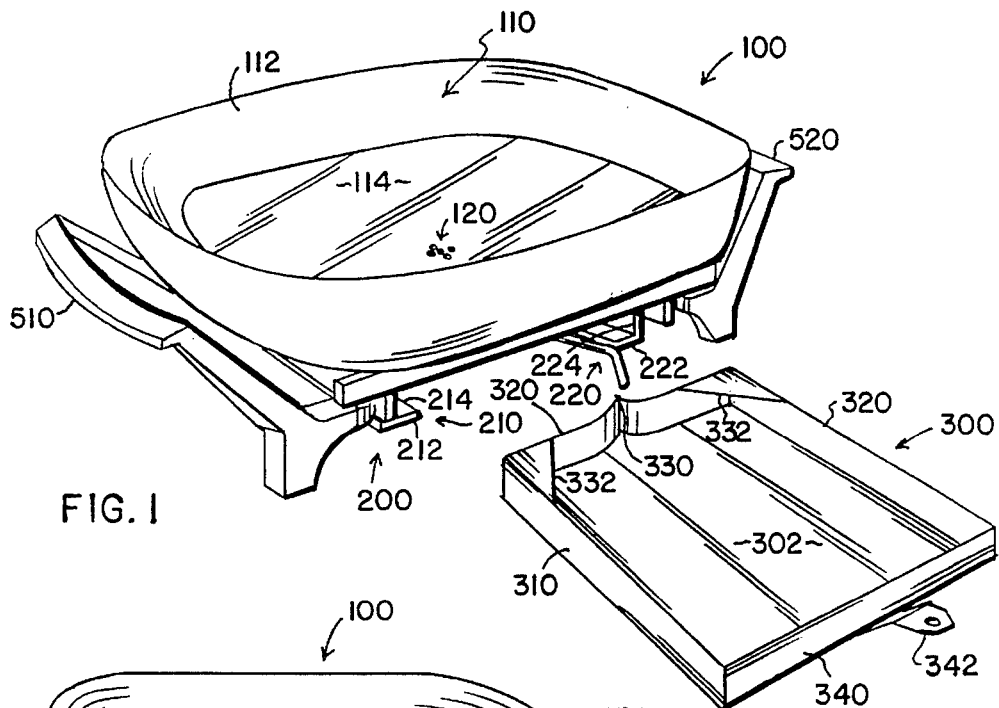
FIG. 1 is a perspective view of the skillet from the front side thereof with the grease tray being removed from the track system.
Figure 2:
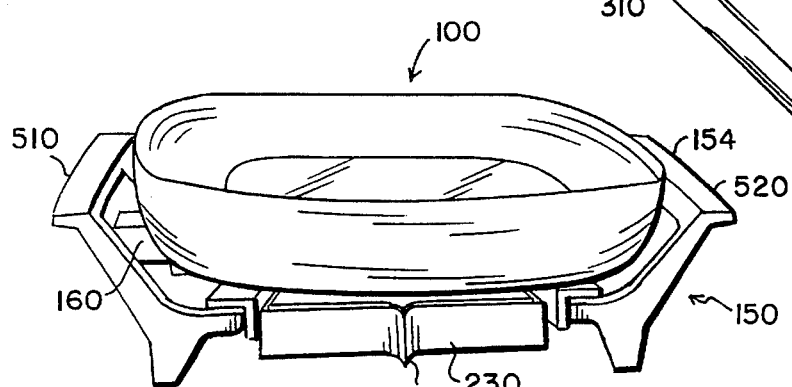
FIG. 2 is a front view of the skillet of FIG. 1.

Turning more particularly to the drawings, FIG. 1 shows a skillet 100 as comprising a pan 110 having a generally upstanding wall 112 surrounding a cooking surface 114 slightly inclined to the center thereof. Located at the center of the preferably inclined cooking surface 114 are a plurality of apertures 120 extending through the surface 114 and to the underside 116 of the pan 110. A socket 160 is engageable with an electrical cord so as to deliver current to the heating coil of the pan, said coil being embodied in a coil housing 162 on the underside 116 of the pan 110.

Figure 3:
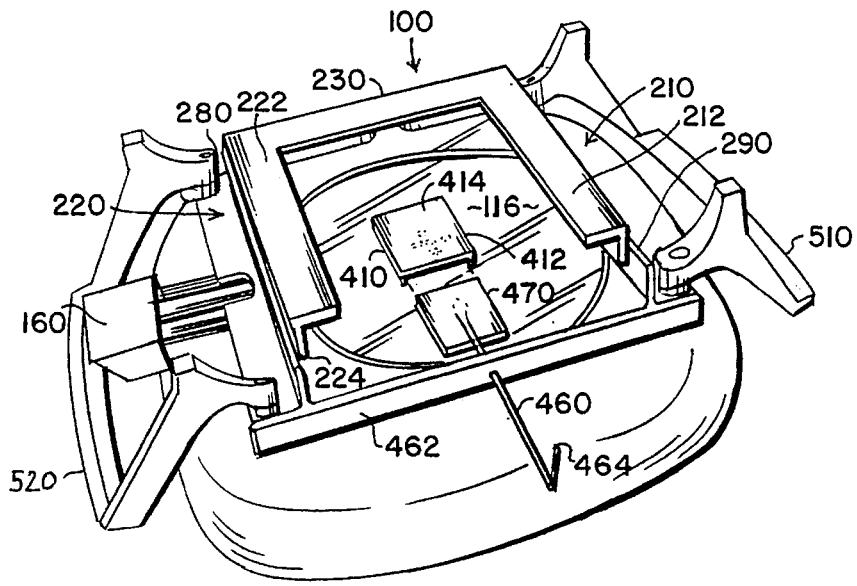
FIG. 3 is a bottom view of the skillet of FIG. 1 with the grease deposit tray being removed so as to show the underlying aperture lid in a fully open position.
Figures 4, 5:
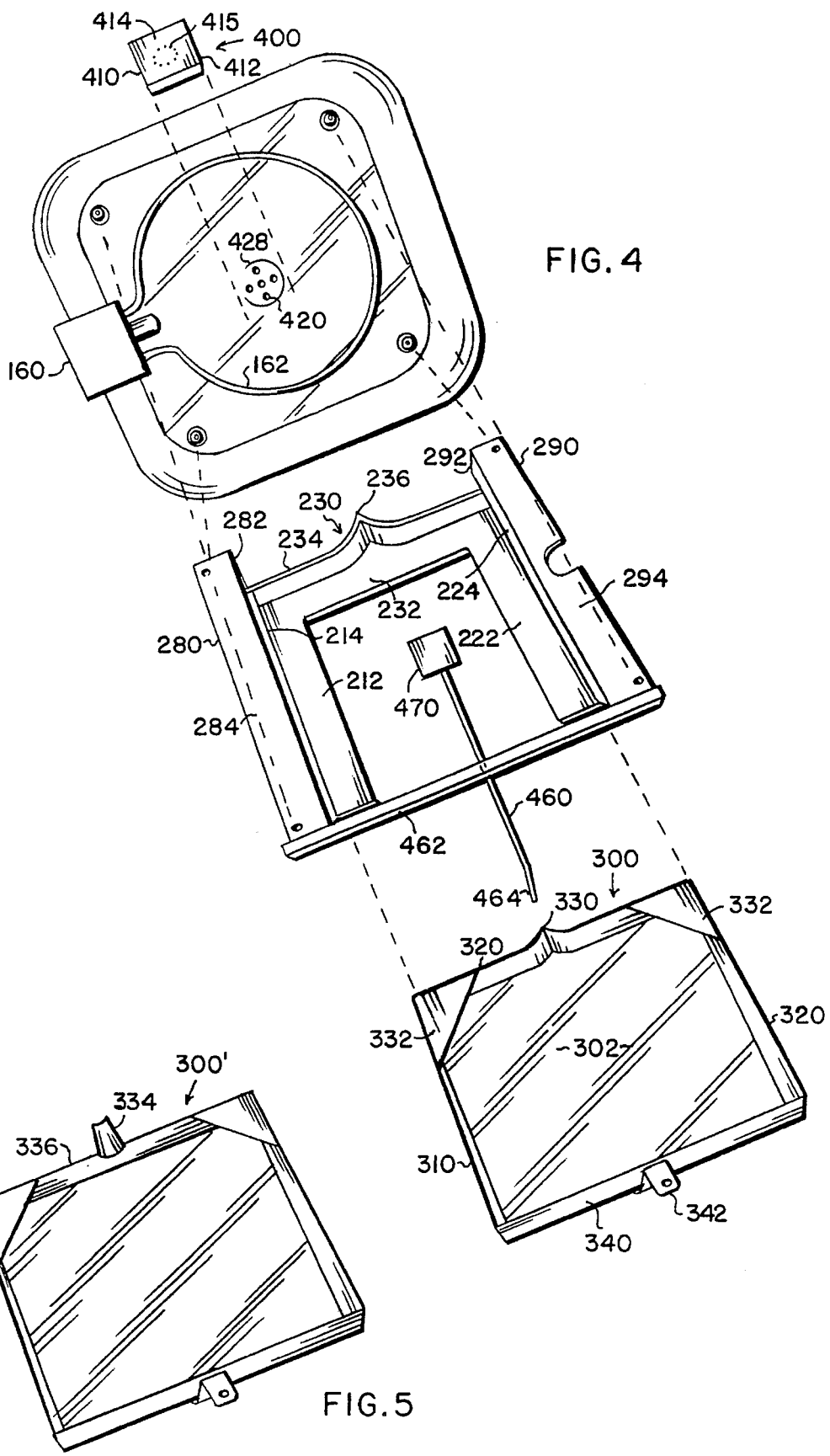
FIG. 4 is an exploded view of the skillet showing the underside of the skillet, the track system, the lid system and the grease tray.
FIG. 5 illustrates an alternative embodiment of the tray utilized in the track system with a funnel at the top, front end thereof.

Further connected to the underside of the pan 110 as best seen in FIGS. 3 and 4 is a track system 200. The track system 200 proper comprises first and second laterally spaced-apart rails 210, 220, each rail having a generally horizontal surface 212, 222 with a wall 214, 224 vertically extending therefrom. Spanning the front end of each rail 210, 220 is a header 230 having a horizontal surface 232 spanning the rail surfaces 212, 222 with a vertical wall 234 extending therefrom. At the middle of the vertical wall 234 of header 230 is a spout 236.

The vertical walls 214, 224 are in turn attached to the vertically depending walls 282, 292 of angle irons 280, 290 with the horizontal surfaces 284, 294 being attached to the underside of the pan 110 by screws or nut/wing bolt combination. As such, the track system 200 depends from the underside of pan 110. Handles 510, 520 are also attached to the angle irons 280, 290.

A grease deposit tray 300 comprises a generally planar base 302 having a pair of lateral walls 310, 320 upwardly extending therefrom. A spout 330 is located at the front longitudinal wall 320 with a handle 342 extending from the rear longitudinal wall 340.

The tray 300 is configured to be releasably slidable along the extent of the rails 210, 220 with the spout 330 being nested in the spout 236 upon the tray being fully positioned within the track 200. Accordingly, movement of the tray in a first direction is precluded by header 230.

Further located at the center of the pan on the underside surface 116 thereof is a flat disc 418 having a plurality of apertures 420 therein. Apertures 420 define the ends of the bores extending from the apertures 120 on cooking surface 114. A housing 400 comprising a pair of side walls 410, 412 and a base 414 surrounds the apertures. The base 414 may be a planar plate or may have an aperture 415 therein as shown in phantom lines in FIG. 4.

A rod 460 presenting a handle end 464 extends through a plate 462 which spans the angle irons 280, 290. Located at the end of the rod 460 is a planar cover 470 which is configured to slide in and out of the housing 400 so as to cover and uncover a selectable number of the apertures 420. The use of the flat disc 418 enhances the seal between the cover 470 and the apertures 420.

In use, upon food being cooked grease will collect on the cooking surface 114 and will be directed to the apertures 120 by the inclined surface 114. It is understood that the incline of the surface is slight such that the food itself will not slide towards the center of the surface 114. Upon removal of the cover 470 from the apertures 420 the grease will pass through aperture 415 and into the underlying tray 300. If the user desires to have grease collect on the cooking surface the cover 470 overlies all of the apertures 420. Alternatively, all or a selected number of the apertures 420 may be uncovered which will regulate the amount of grease drained from the cooking surface 114 and into the underlying tray 300. It is here noted that the use of the housing 400 with aperture 415 facilitates the drainage of grease into the tray 300.

Upon collection of the grease in the tray 300 the tray 300 is removed from the track 200 with the grease then being poured out of the tray 300 through the spout 330. Diagonal corner flanges 332 extending atop the front corners of the tray preclude spillage of the grease from these tray 300 corners.

An alternative tray 300' is as shown in FIG. 1 having a funnel 334 extending from the front wall 336. In this tray embodiment the front wall 336 of the tray 300' is higher than the header wall 234 of the track system 200 to allow the funnel 334 to extend over this header wall 234.

Accordingly, I have provided a skillet 100 which may be used by different individuals so as to remove various amounts of grease, if any, from the cooking surface 114. As such the user need not keep watch over the cooking food and continuously drain the grease from the cooking surface by previous cumbersome methods. Accordingly, my skillet 100 is adaptable for user with various foods and the various cooking tastes of the individual users.

It is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. In a skillet having a cooking surface, the improvement comprising:

a plurality of apertures centrally located in the cooking surface, said apertures defining one end of a bore extending to an underside of the cooking surface, said bore presenting a second plurality of apertures on the underside surface;

track means mounted on the underside surface for defining a course therealong;

a tray slidable along said track to a position underneath said second apertures;

a cover;

means for mounting said cover to the underside of the cooking surface in movement between a first position covering said second plurality of apertures and a second position displaced from a selected number of said plurality of apertures, whereby grease formed on the cooking surface is directed through the first plurality of apertures and out the second plurality of apertures not covered by said cover into said tray therebelow.

2. The device as claimed in claim 1 wherein said track means comprises:

first and second spaced apart rails;

means for mounting said rails to the underside of the cooking surface in a position displaced therefrom.

3. The device as claimed in claim 2 further comprising a plate spanning a first end of said rails, said plate limiting said slidable movement of said tray beyond a first end of said rails.

4. The device as claimed in claim 3 further comprising:

a spout at a front end of said tray;

a spout in said plate for receiving said tray spout in a nested relationship therebetween.

5. The device as claimed in claim 3 further comprising a funnel at a front end of said tray, said funnel passing over said plate upon said tray contacting said plate.

6. The device as claimed in claim 1 wherein said lid mounting means comprises:

a flange mounted to an underside of the cooking surface;

a handle having a first end connected to said lid, said handle extending through said flange and presenting a free end, said flange supporting said handle in back and forth movement therethrough.

7. The device as claimed in claim 6 further comprising a housing surrounding said second plurality of apertures, said housing receiving said lid therein.

8. The device as claimed in claim 7 wherein said housing further comprises an aperture therein, the grease discharged from said second plurality of apertures passing through said housing aperture.

9. The device as claimed in claim 1 further comprising a flat plate on the underside of the cooking surface, said plate containing said second plurality of apertures, said plate enhancing said coverage of said cover with said second plurality of apertures.

10. The device as claimed in claim 9 wherein said lid includes a planar surface for contact with said flat plate.

11. In a skillet having a cooking surface, the improvement comprising:

a plurality of apertures centrally located in the cooking surface, said apertures defining one end of a bore extending to an underside of the cooking surface, said bore presenting a second plurality of apertures on the underside surface;

track means mounted on the underside surface for defining a course therealong;

a tray slidable along said track to a position underneath said second apertures;

a cover;

a housing for said cover, said housing surrounding said apertures;

means for mounting said cover to the underside of the cooking surface in slidable movement in said housing between a first position covering said second plurality of apertures and a second position displaced from a selected number of said plurality of apertures, whereby grease formed on the cooking surface is directed through the first plurality of apertures and out the second plurality of apertures not covered by said cover through said housing and into said tray therebelow.

12. The device in claim 11 further comprising an aperture in said housing, said aperture draining the grease from said housing.

13. The device as claimed in claim 12 wherein the cooking surface is inclined toward said first plurality of apertures.

14. In a skillet having a cooking surface, the improvement comprising:

a plurality of apertures centrally located in the cooking surface, said apertures defining one end of a bore extending to an underside of the cooking surface, said bore presenting a second plurality of apertures on the underside surface;

a cover;

means for mounting said cover to the underside of the cooking surface in movement between a first position covering said second plurality of apertures and a second position displaced from a selected number of said plurality of apertures, whereby grease formed on the cooking surface is directed through the first plurality of apertures and out the second plurality of apertures not covered by said cover.

15. In a skillet having a cooking surface, the improvement comprising:

at least one first aperture centrally located in the cooking surface, said at least one aperture defining one end of a bore extending to an underside of the cooking surface, said bore presenting at least one second aperture on the underside surface;

track means mounted on the underside surface for defining a course therealong;

a tray slidable along said track to a position underneath said at least one second aperture;

a cover;

means for mounting said cover to the underside of the cooking surface in movement between a first position covering said at least one second aperture and a second position displaced from at least one second aperture, whereby grease formed on the cooking surface is directed through said at least one first aperture and out said at least one second aperture not covered by said cover into said tray therebelow.

16. In a skillet having a cooking surface, the improvement comprising:

at least one aperture centrally located in the cooking surface, said at least one aperture defining one end of a bore extending to an underside of the cooking surface, said bore presenting at least one second aperture on the underside surface;

a cover;

means for mounting said cover to the underside of the cooking surface in movement between a first position covering said at least one second aperture and a second position displaced from said at least one second aperture, whereby grease formed on the cooking surface is directed through said at least one first aperture and out said at least one second aperture not covered by said cover.

* * * * *